Sept. 13, 1966 R. A. LORENZINI 3,272,186
PACKAGED STEAM GENERATOR
Filed Nov. 25, 1964 8 Sheets-Sheet 1

INVENTOR
ROBERT A. LORENZINI
BY John Macie II
ATTORNEY

Sept. 13, 1966  R. A. LORENZINI  3,272,186
PACKAGED STEAM GENERATOR
Filed Nov. 25, 1964  8 Sheets-Sheet 2

INVENTOR
ROBERT A. LORENZINI
BY John Maier, III
ATTORNEY

Sept. 13, 1966 R. A. LORENZINI 3,272,186
PACKAGED STEAM GENERATOR

Filed Nov. 25, 1964 8 Sheets-Sheet 4

Fig. 8.

INVENTOR
ROBERT A. LORENZINI
BY John Maier, III
ATTORNEY

Sept. 13, 1966   R. A. LORENZINI   3,272,186
PACKAGED STEAM GENERATOR

Filed Nov. 25, 1964   8 Sheets-Sheet 7

INVENTOR
ROBERT A. LORENZINI
BY John Maier, III
ATTORNEY

United States Patent Office 3,272,186
Patented Sept. 13, 1966

3,272,186
PACKAGED STEAM GENERATOR
Robert A. Lorenzini, Westport, Conn., assignor to Foster Wheeler Corporation, New York, N.Y., a corporation of New York
Filed Nov. 25, 1964, Ser. No. 413,910
4 Claims. (Cl. 122—336)

This invention relates to steam generators and more particularly to packaged steam generators.

There are many obvious advantages to the utilization of packaged steam generators. Within the boiler shop, the cost of building a steam generator is vastly less than the construction of a similar steam generator in the field. In many locations, the skilled workers which are needed for the construction of a steam generator are not available and importing such trained workers makes the cost of a steam generator prohibitive.

A packaged steam generator, however, must be transported, usually by railroad, to the place of operation. This is the major limitation on packaged construction. In railroad transportation, there are definite limitations placed on the height, length, and width of any article being shipped. It has become a practice in the construction of packaged steam generators to utilize railroad cars which have a depressed center bed. A depressed center bed permits greater height in a packaged steam generator which will still fit through railroad tunnels and other locations within a railroad system. The use of such depressed center-bed railroad cars has, however, created still another limitation. Since the length of the depressed bed is substantially shorter than that of a regular flatbed railroad car, a greater limitation is placed upon the length of packaged steam generators. Such a limitation in length obviously results in a limitation upon the maximum capacity of packaged steam generators.

With increased steam capacity being required, it is highly advantageous to be able to provide a packaged steam generator of increased capacity over that currently available. Likewise, with increasing labor costs for on-site construction, it is increasingly important to use packaged steam generators.

It is therefore an object of this invention to provide a packaged steam generator of increased capacity.

Another object of this invention is to provide a packaged steam generator which utilizes more of the surface area of a depressed-bed railroad car.

Other objects and a fuller understanding of the invention may be had by referring to the following description and claims, taken in conjunction with the accompanying drawings in which:

Figures 4, 5, 6:
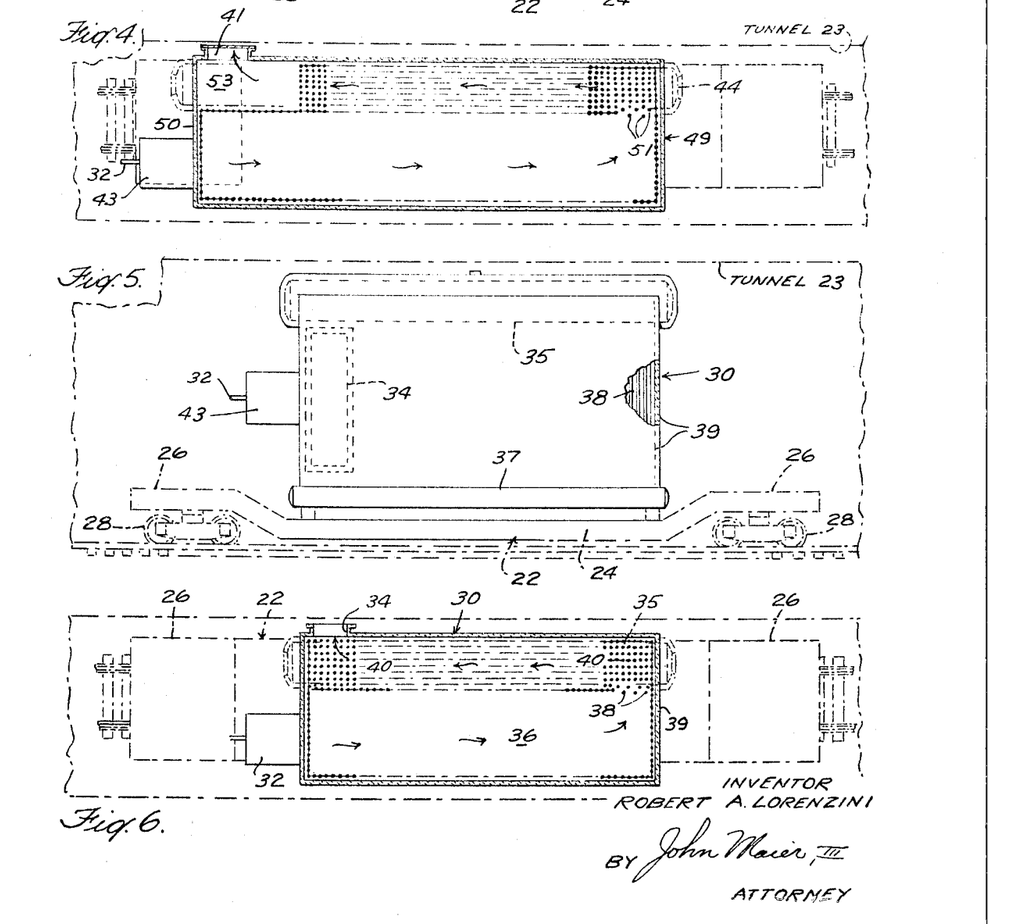
FIGURE 4 is a horizontal section taken on line 4—4 of FIG. 3.
FIGURES 5 and 6 are a side elevation and plan section respectively, of the prior art.
Figure 7:
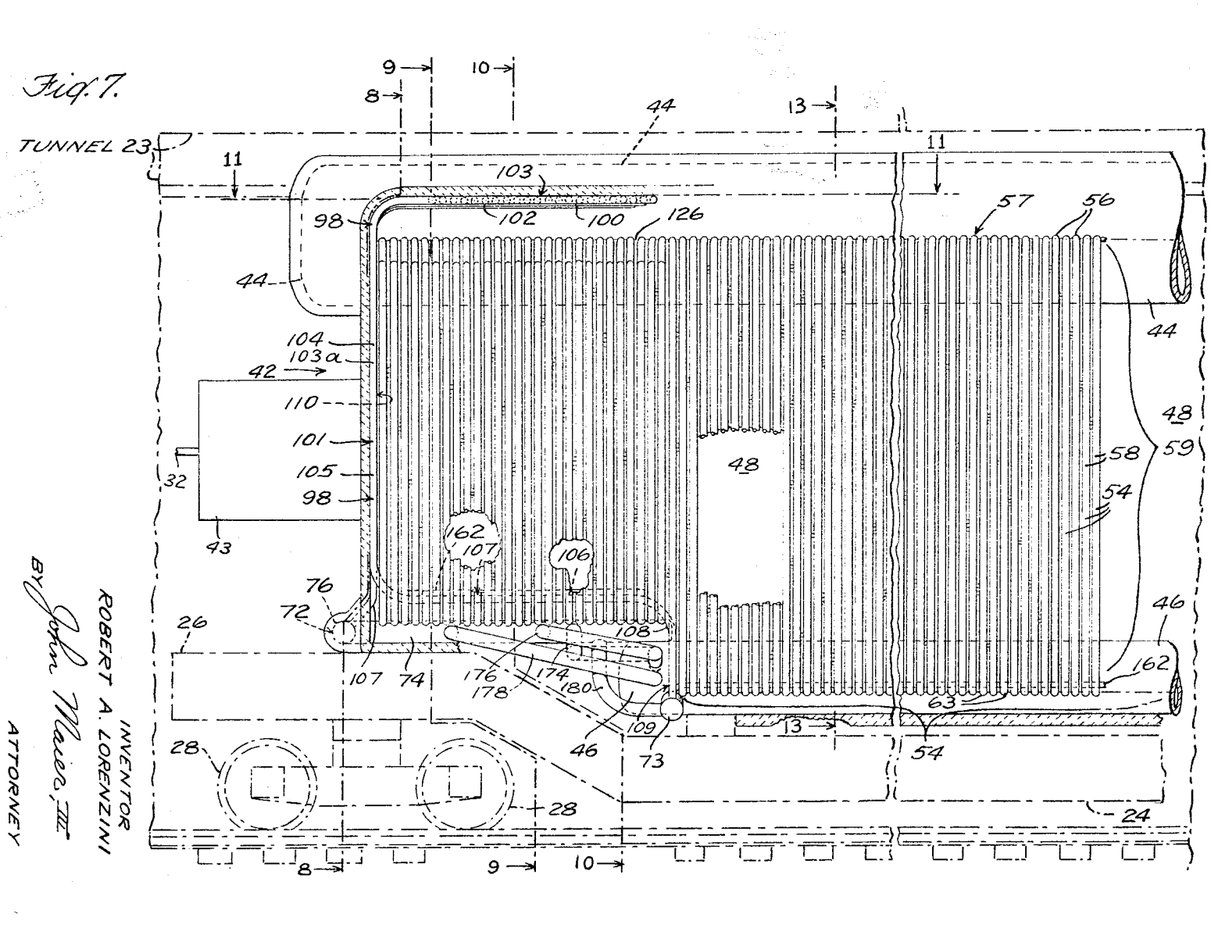
FIGURE 7 is a left-hand portion of a packaged steam generator in vertical longitudinal cross section on an enlarged scale.
Figure 8:
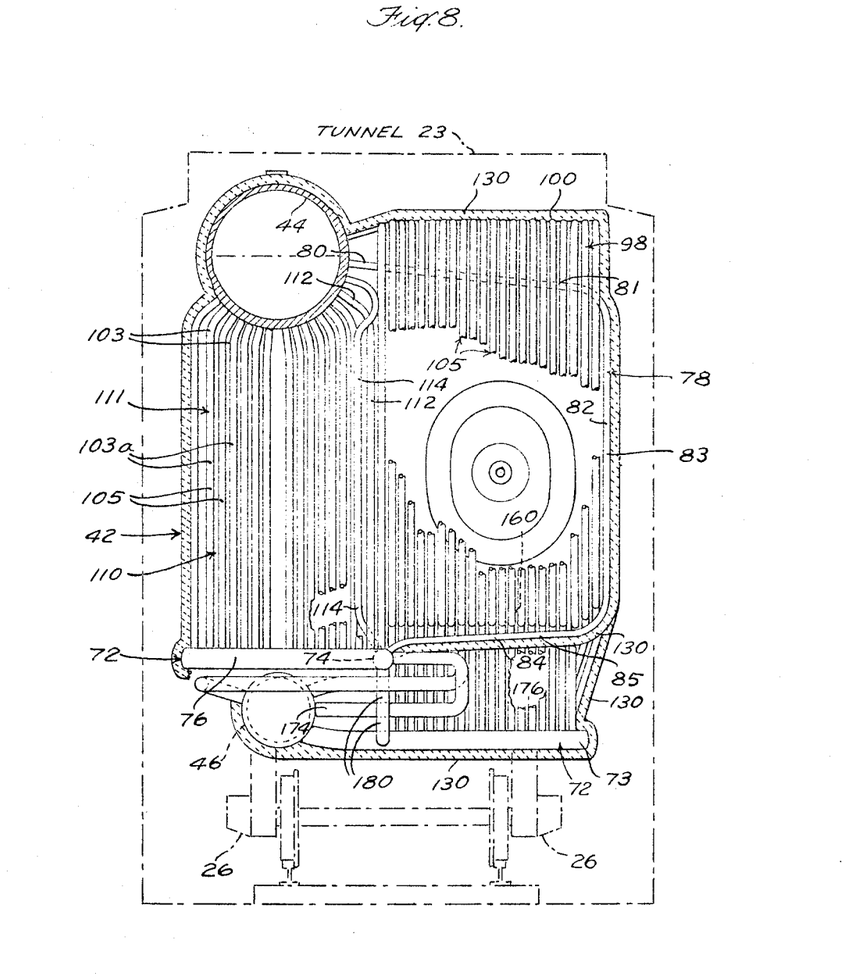
FIGURE 8 is a vertical end section taken on line 8—8 of FIG. 7.
Figure 9:
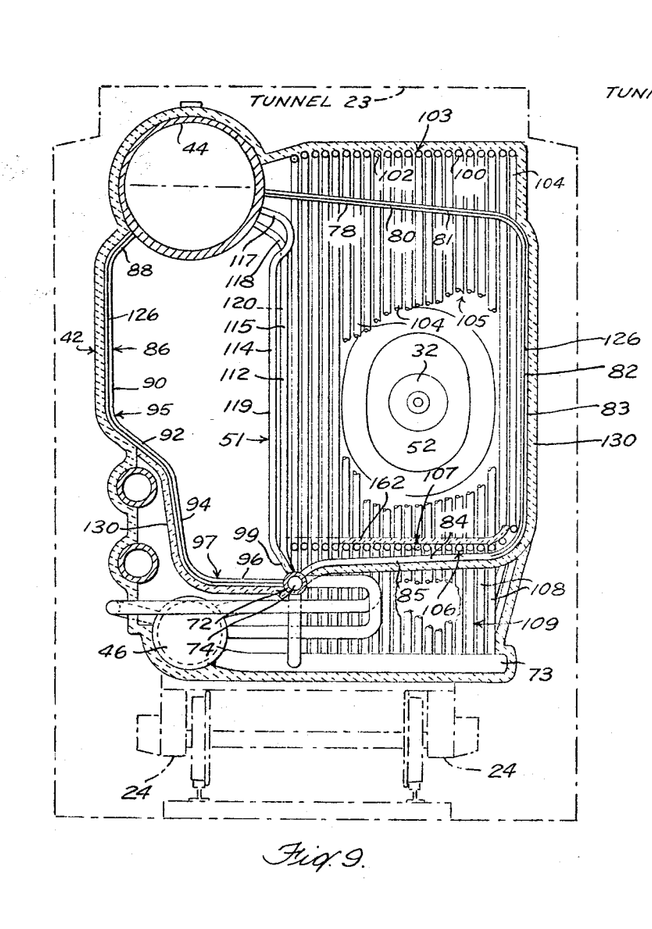
FIGURE 9 is a similar vertical section taken on line 9—9 of FIG. 7.
Figure 10:
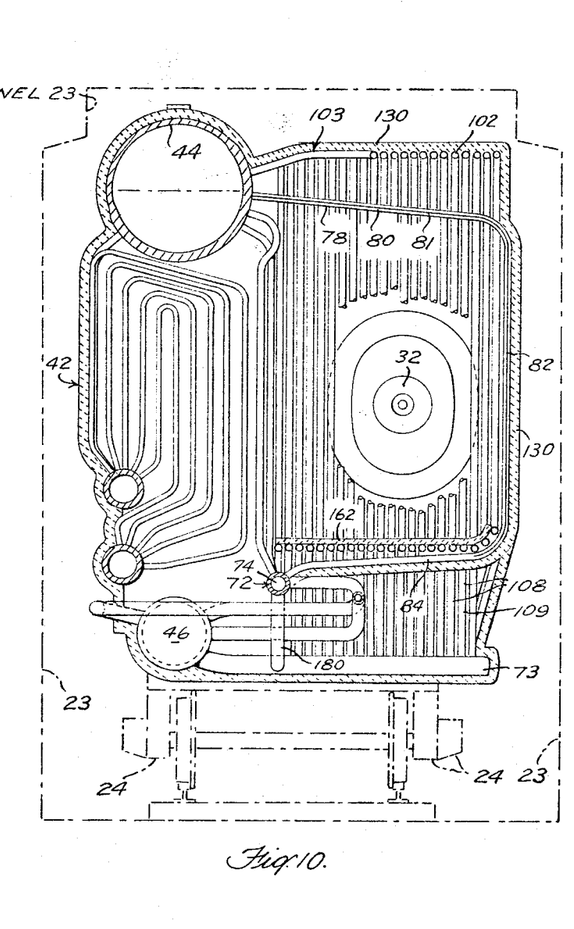
FIGURE 10 is a similar section taken on line 10—10 of FIG. 7.

Referring now to the drawings and more particularly to FIGURE 5, a railroad car 22 is shown having a depressed center-bed 24, and raised end portions 26 located over the car wheels 28. A packaged steam generator 30 of the general outline of those available in the prior art is located on the depressed center bed 24 of the railroad car 22. The use of the depressed center bed 24 is necessitated by the limitations of the tunnel outlines 23 within a railroad system. It is noticeable in FIGURE 5 that the surface of the raised portion 26 of the railroad car 2 cannot be used. This limits the maxmum length of the packaged steam generator 30 to the length of the depressed center bed 24.

The packaged steam generator 30 has a burner 32 mounted at one end with a gas outlet 34 located at one side of the packaged steam generator 30 adjacent the burner 32. Longitudinally across the top of the packaged steam generator 30, a steam drum 35 is located. A water drum 37 is located longitudinally across the bottom of the packaged steam generator 30.

For purposes of clarity, the side in all views having a flue gas outlet will be designated the rear side while the opposite side will be designated the front side.

Referring to FIGURE 6, which shows in simplified form a top cross-sectional area of the packaged steam generator 30 of FIGURE 5, a flame chamber 36 extends the length of the furnace 30 in line with the burner 32. The flame plasma and hot combustion gases pass from the burner 32 along the flame chamber 36 to the end 39 opposite the burner where the flame and hot gases make a U-turn as indicated by the arrows, through double rows of screen tubes 38 and then pass backwards to the outlet 34 through a tube bank 40.

Figure 1:
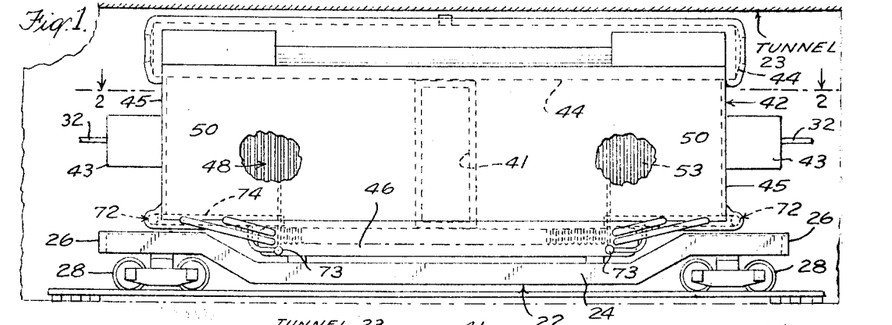
FIGURE 1 is a side elevation of the invention on a greatly reduced scale utilizing a double extension with the carrier in dotted lines.

In FIGURE 1 the railroad car 22 is again shown but having located thereon a packaged steam generator 42 constructed in accordance with this invention. Opposing burners 43 are located on the right and left ends 45. A gas outlet 41 is located on the rear side 47 and intermediate the ends 45. The steam generator 42 has a main section 48, and extension 50 on the right and left ends. The main section 48 is, in general, equivalent to the prior-art packaged steam generator 30 shown in FIGURES 5 and 6. It is noted that the extensions 50 extend over the raised portions 26 of the railroad car 22, thereby utilizing the space left empty with the steam generator 30 of prior art design.

Figure 2:
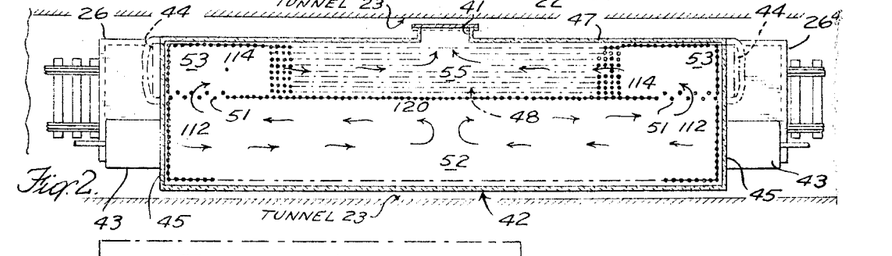
FIGURE 2 is a horizontal section taken on line 2—2 of FIG. 1 with certain parts in dotted lines.

As best seen in FIGURE 2, the opposing streams of flame and hot gases within the packaged generator 42 are injected along a common line from burners 43 in opposing directions as indicated by the arrows. The streams meet approximately midway in a gas chamber 52 which extends the entire length of the steam generator 42. The hot gases then swirl backward in a U-turn as indicated by the arrows before making another U-turn as also indicated by the arrows in FIGURE 2 through screen tubes 51 and then into corner compartments 53 before entering a tube bank 55 from which both streams exit through the gas outlet 41.

Longitudinally across the top of the packaged steam generator 42 is a steam drum 44 which extends the entire length of the steam generator 42. Located longitudinally across the bottom of the steam generator 42 is a water drum 46. The details of the steam generator 42 will subsequently be described in greater detail.

Use of the design of packaged steam generator shown in FIGURES 1 and 2 can result in a capacity increase of 40 percent over the design shown in FIGURES 5 and 6.

Figure 3:
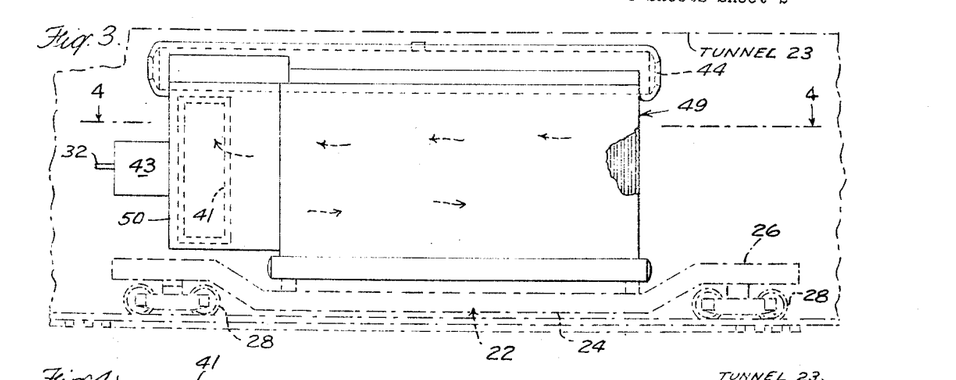
FIGURE 3 is a side elevation similar to FIG. 1 showing one embodiment of the invention utilizing a single extension.

In FIGURES 3 and 4 is shown a modified version 49 of the invention in which only one extension 50 is located on only one end of the main section 48. A burner 43 is located at the end of the extension 50. Although the flame and flow of gas pattern are similar to those used in the prior art, the construction of such a unit is almost identical with that used in the double extension shown in FIGURES 1 and 2. However, there is only one set of screen tubes 51 and the corner compartment 53 is located at the end near the burner 43 and opposite from the screen tubes. The details of construction of an extension, however, is applicable to both the double extension embodiment and the single extension embodiment. The details of construction follow hereinafter.

Referring now to FIGURES 7 through 13, main front tubes 54 are used to enclose the main compartment 48 of the steam generator 42. The main front tubes 54 have a roof section 56 which extends from the steam drum 44 and slopes slightly downwardly to form a roof panel 57 over the main compartment 48. The main front tubes 54 then bend to a vertical section 58 which extends straight downwardly to form with the vertical section 58 a main front panel 59. A bottom section 62 bends sharply inwardly while sloping slightly downwardly, to connect with the water drum 46 and serve as a floor panel 63.

Main rear tubes 64 have a vertical section 66 and an upper section 68 which is inwardly inclined to connect with the steam drum 44 and a lower section 70 which bends to the horizontal where the tubes 64 connect with the water drum 46. The main rear tubes 64 form a main rear panel 65 which encloses the rear side of the main section 48. Fins 126 are located between the tubes 64 in the panel 65.

Extending in a horizontal plane above the horizontal plane of the water drum 46 is a lower side header 72. The lower side header 72 has a longitudinal section 74 extending beyond the water drum 46. An end section 76 of the lower side header 72 lies in the same horizontal plane as the longitudinal section 74, but at approximately a right angle therewith. Extending at approximately right angles outwardly from the water drum 46 is a lower burner wall header 73.

Extension side tubes 78 extend from the steam drum 44 to the lower side header 72. The tubes 78 extend outwardly along an upper section 80 which slopes slightly downwardly forming a lower roof panel 81. The tubes 78 then bend to a vertical section 82 forming a front extension panel 83 before bending inwardly along a lower section 84 to connect with the longitudinal section 74 of the lower side header 72. The lower section 84 forms a forward floor panel 85.

Rear extension tubes 86 which extend from the steam drum 44 to the lower side header 72 bend slightly downwardly from the steam drum 44 along upper section 88 before bending vertically downwardly approximately half the height of the steam generator 42 along a vertical section 90. The rear extension tubes 86 then slope sharply inwardly and slightly downwardly along an intermediate section 92 before sloping sharply downwardly and slightly inwardly along a lower section 94 at which point the tube 86 bends to the horizontal along bottom section 96 and connects to the longitudinal section 74 of the lower side header 72. The sections 88, 90, 92, 94 form a rear extension panel 95 while section 96 forms a rear floor panel 97. The rear floor panel 97 and the forward floor panel 85 are located at a higher level than the floor panel 63 for reasons previously explained.

Forward burner wall tubes 98 which connect the steam drum 44 to the lower burner wall header 73 slope slightly downwardly from the steam drum 44 forming a traverse roof section 100. The tubes 98 then bend at approximately right angles and slope slightly downwardly to form a longitudinal roof section 102. The traverse roof sections 100 and the longitudinal roof sections 102 form an upper roof panel 103. An approximately right-angle bend downwardly forms a vertical section 104 which comprises a forward burner wall panel 105. The tubes 98 then slope inwardly to a floor section 106 before bending downwardly to a lower burner section 108 which connects with the lower burner wall header 73. A front floor panel 107 is formed from floor sections 106 and a lower burner wall panel 109 is formed from lower burner sections 108.

Rearward burner wall tubes 110 project from the steam drum 44 along upper section 103 and then bend to a vertical section 103a. At the lower end the tubes 110 bend outwardly along a lower section 107 to connect with the end section 76 of the lower side header 72. The tubes 110 form a rearward burner wall panel 111. The rearward burner wall panel 111 and the forwad burner wall panel 105 together constitute a complete burner wall panel 101.

Figure 12:
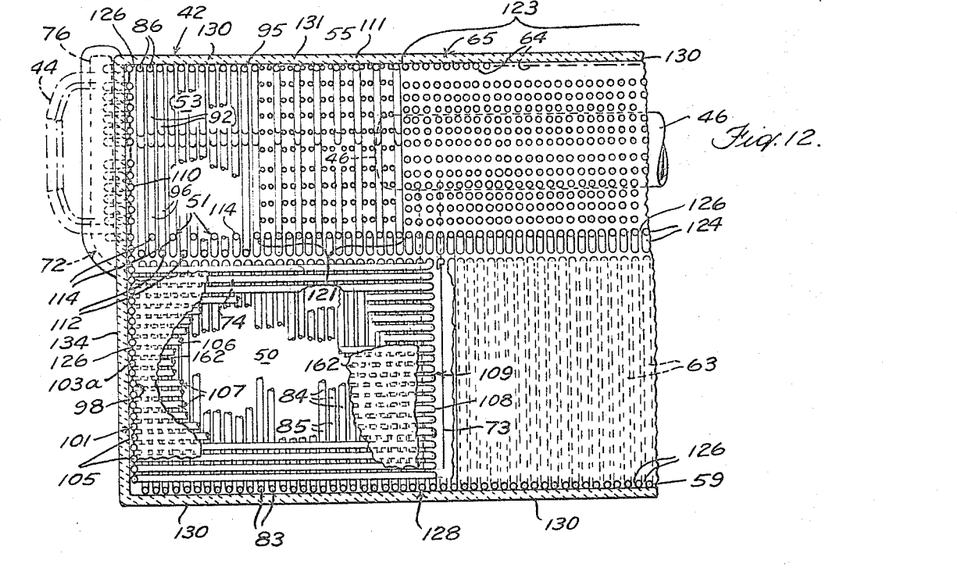
FIGURE 12 is a plan section of FIG. 11.

The screen tubes 51 are located at the entrance way to the corner compartment 53 and have a front row of tubes 112 and rear row of tubes 114. The tubes 112 and 114 connect the steam drum 44 with the longitudinal section 74 of the lower side header 72 as best shown in FIGURE 12. The tubes 112 extend outwardly from the steam drum 44 along an upper section 118 and then bend to a vertical section 115 before sloping slightly toward the front wall along lower section 116 which connects with the section 74 of the header 72. The tubes 114 extend outwardly and then loop inwardly along an upper section 117 before extending along a vertical section 119. A lower section 99 extends slightly outwardly and connects with the longitudinal section 74 of the lower side header 72.

In the same vertical plane as the rear row 114 of screen tubes 51 is a partition panel 120 which separates the flame chamber 52 from the tube-bank chamber 55. As best shown in FIGURE 12, a portion 121 of the partition panel is within the extension 50 and a portion 123 within the main compartment 48. The tubes 114 form portion 121 while the portion 123 is comprised only of tubes 124.

Figure 13:
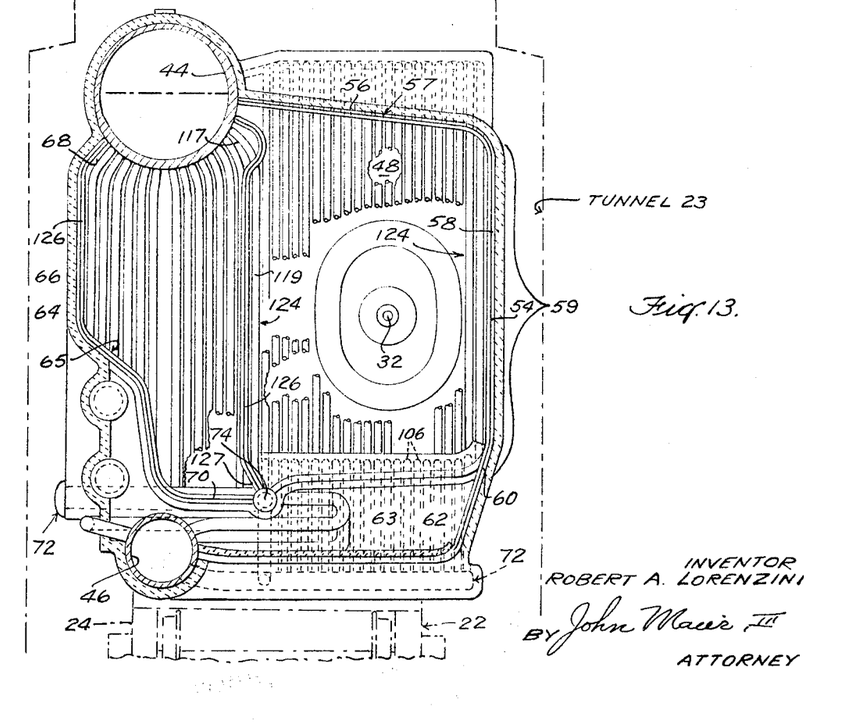
FIGURE 13 is a vertical section similar to FIG. 10 taken on line 13—13 of FIG. 7.

As best shown in FIGURE 13, the tubes 124 have a loop section similar to section 117 of tubes 114. Likewise, a vertical section similar to section 119 of tubes 114. However, the end section 127 bends inwardly to connect with the water drum 46 instead of the lower side header 72 as with tubes 114. The tubes 112 and 124 of the partition panel 120 are secured together to form an air-tight panel by means of fins 126. The main front panel 59 and front extension panel 83 form together a front panel 128. Within the front panel 128 the tubes 54 and 78 are connected together to form a solid gas-tight barrier by means of the fins 126. Insulation 130 coats the outside of the front panel 128.

The burner wall panel 101 has fins 126 between the tubes 98, 110 and has a layer of refractory 134 located thereon. The rear burner wall portion 111 of the burner wall panel 101 has a layer of insulation 130 on the outside. The insulation 130 continues across the entire rear wall 131 formed by panels 65, 95.

The area of the rear extension panel 95 within the corner compartment 53 has fins 126 between the tubes 86. The rear floor panel 97 forms a part of the floor within the extension.

Panel 107 in extension 50 is covered by refractory 162 which extends over panel 63 in the main section 48. The rear floor panel 97 has fins 126 between the tubes 86. Insulation 130 is applied on the outside surface of the rear floor panel 97 and on the outside of the front extension floor 160 and the main floor 166. Within the extension 50, the upper roof panel 103 is located above the lower roof panel 81. The tubes within the panel 81 are connected by fins 126 while the panel 103 is embedded within insulation material 130.

Figure 11:
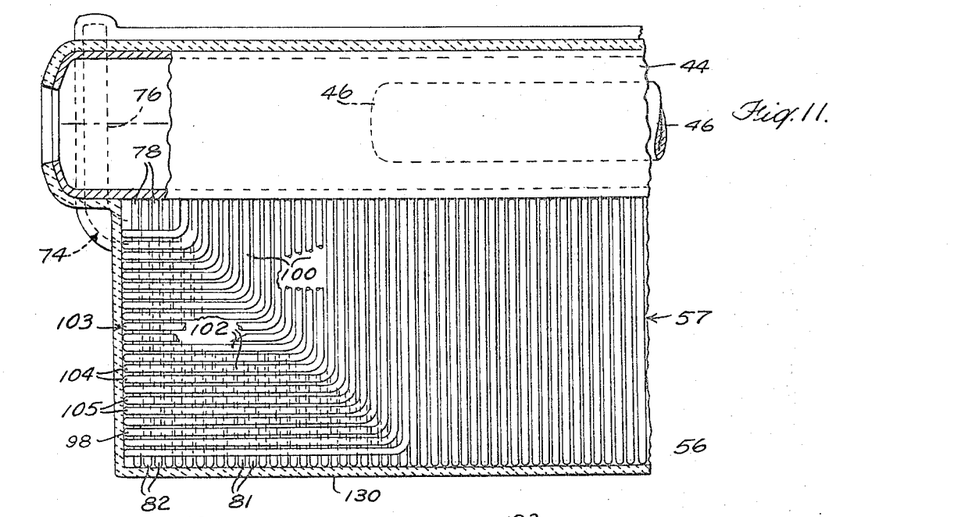
FIGURE 11 is a plan section of the left-hand portion of the packaged steam generator with roof portions broken away, taken on line 11—11 of FIG. 7.

A superheater section 142 is located within the tube bank 55. Within the superheater section, superheater tubes 144 are located. These tubes are best shown in FIGURES 11 and 12. The superheater tubes 144 interconnect between two superheater headers 146, 148. A superheater connecting pipe 150 runs from the top of the steam drum to the upper superheater header 146. This pipe 150 serves to supply the wet steam from the steam drum into the superheater system. The superheated steam then leaves the lower superheater header 148 for whatever use the packaged steam generator 42 is being utilized. Since the superheating connecting pipe 150 extends outside of the packaged steam generator 42, this one pipe is disconnected for purposes of transportation and is added to the unit in the field by a simple pipe connection such as flange or weld joints.

An arrangement of headers and connectors is made to supply the water drainage from the tubes located within the extension to the water drum 46. As has been pointed out, a header 73 extends at right angles from the bottom of the water drum 46 in a horizontal plane. This lower burner wall header 73 is directly connected with the tubes 98. This includes the roof, burner wall, and extension floor panels. The remaining tubes 110 and 78 discharge into the lower side header 72. An angle connector 180 connects the lower side header 72 to the lower burner wall header 73, while an outer connector 174, an intermediate connector 176, and an inner connector 178 connect the lower side header 72 directly to the water drum 46.

Figure 14:
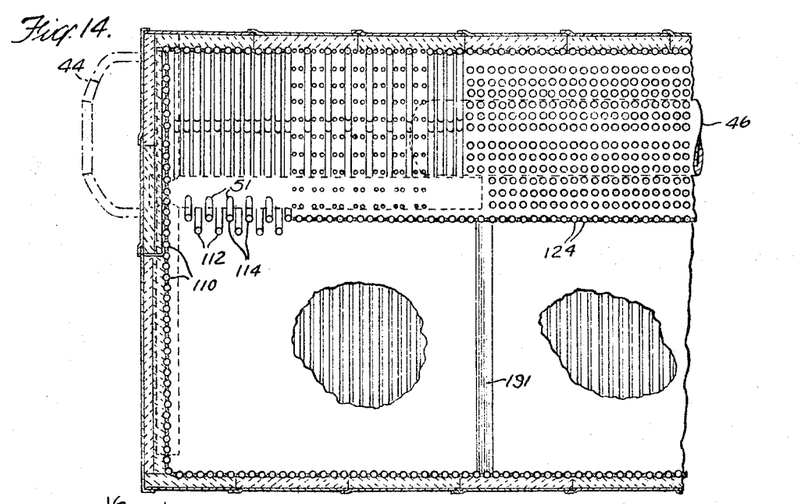
FIGURE 14 is a horizontal section taken on line 14—14 of a modified structure of the generator shown in FIGS. 7 to 13 inclusive.
Figure 15:
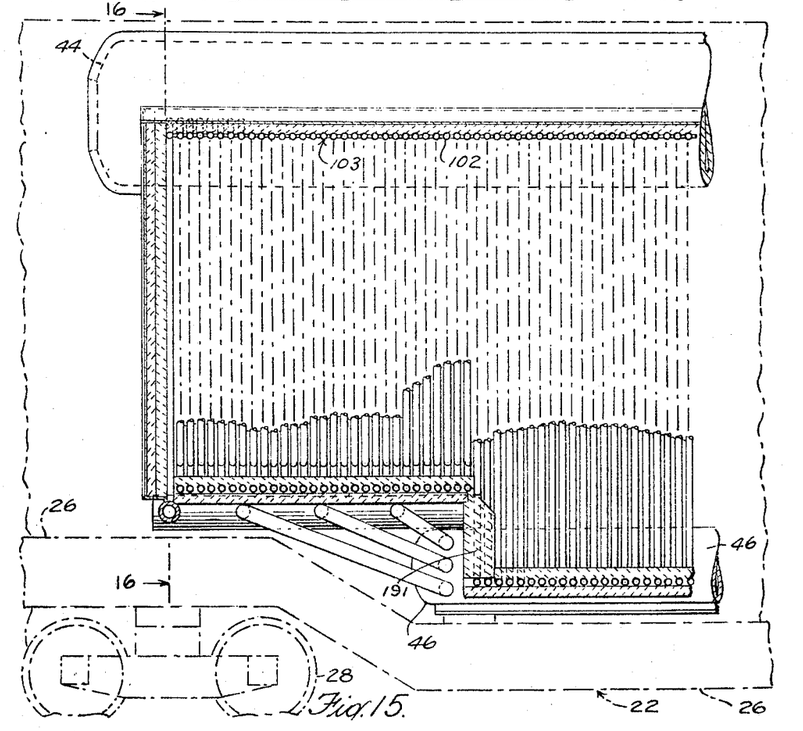
FIGURE 15 is a vertical section taken on line 15—15 of FIG. 16.
Figure 16:
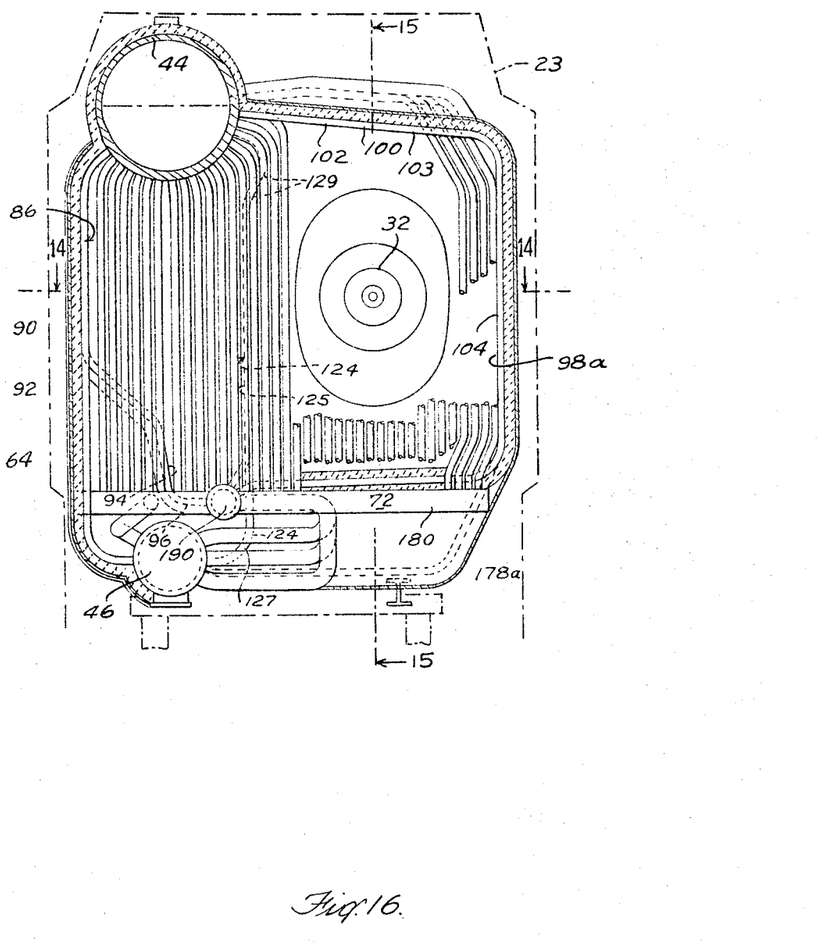
FIGURE 16 is a vertical section taken on line 16—16 of FIG. 15.

In FIGURES 14 through 16, a modified version of the invention is shown. The design is very similar except that the tubes 98 are replaced by tubes 98a. The tubes 98a like the tubes 98 extend lightly downwardly from the steam drum 44 forming a traverse roof section 100. The tubes 98a then bend at approximately right angles and slope slightly downwardly to form a longitudinal roof section 102. As in the previously-described embodiment, the traverse roof sections 100 and the longitudinal roof sections 102 from an upper roof panel 103. An approximately right-angle bend downwardly forms a vertical section 104 and connects to an extension header 180. The extension header 190 extends from the lower side of header 72 as a continuation of the end section 76 on the opposite side of the longitudinal section 74.

Since the front floor panel 107 and the lower burner wall panel 109 are eliminated, the lower burner wall header 73 is eliminated. In place of the burner wall panel 109, a refractory block 191 is used. Likewise the angle connector 180 is eliminated and the inner connector 178 is replaced with inner connector 178a which is similar to inner connector 178 but follows a more direct path to the water drum 46 due to the elimination of the lower burner wall header 73.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A steam generator comprising:
   a water drum,
   a steam drum located above said water drum and having a length greater than said water drum, the longitudinal axis of the steam drum and the water drum being substantially parallel;
   a T-shaped lower side header located in a horizontal plane slighly above said water drum and substantially below said steam drum, said T-shaped header extending longitudinally from said water drum a distance approximately equal to the distance said steam drum extends beyond said water drum at which point the T-shaped lower side header bends at approximately right angles in both directions to form the T-shape;
   conduit means for connecting said T-shaped lower side header to said water drum;
   a main front tube panel forming a main roof, a main front wall, and a main floor, said main front tube panel being directly connected to both asid steam drum and said water drum,
   a main rear tube panel forming a main rear wall, said main rear tube panel being directly connected to both said steam drum and said water drum, said main front tube panel and said main rear tube panel forming a main enclosure;
   extension side tubes forming a lower extension roof as a continuation of said main roof, an extension front wall as a shortened continuation of said main front wall, and an extension floor located in a higher plane than said main floor, said extension side tubes being connected directly to both said steam drum and to said T-shaped lower side header
   forward burner-wall tubes forming a forward burner wall, said burner wall tubes being connected directly to both said steam drum and said lower burner wall header;
   rearward burner wall tubes forming with said forward burner wall an extension end wall, said rearward burner wall tubes being connected directly to both said steam drum and said T-shaped lower side header;
   rear extension tubes forming a rear extension panel, said rear extension tubes being connected directly to both said steam drum and said lower side header, said extension side tubes, said forward burner wall tubes, and rearward burner wall tubes, and said rear extension tubes, forming an extension enclosure extending from said main enclosure;
   partition tubes within both said main enclosure and said extension enclosure, said partition tubes within said main enclosure being connected directly to said steam drum and said water drum and said partition tubes within said extension enclosure being connected to said steam drum and said T-shaped lower side header, and
   multiple tubes forming a main bank of tubes within said enclosure rearwardly of said partition tubes, said main bank of tubes being connected directly to said steam drum and said water drum.

2. A steam generator comprising:
   a water drum;
   a steam drum located above said water drum and having a length greater than said water drum, the longitudinal axis of the steam drum and the water drum being substantially parallel;
   an L-shaped lower side header located in a horizontal plane slightly above said water drum and substantially below said steam drum, said L-shaped header extending longitudinally from said water drum a distance approximately equal to the distance said steam drum extends beyond said water drum at which point the L-shaped lower side header bends at approximately a right angle to form the L-shape;
   a lower burner-wall header connected at one end to said water drum and extending from said water drum in a horizontal plane from the end of said water drum at a point adjacent said L-shaped lower side header, the longitudinal axis of said water drum and said lower burner wall header being at right angles;

at least one conduit for connecting said L-shaped lower side header to said lower burner-wall header;

a conduit for connecting said L-shaped lower side header to said water drum;

a main front tube panel forming a main roof, a main front wall, and a main floor, said main front tube panel being directly connected to both said steam drum and said water drum;

a main rear tube panel forming a main rear wall, said main rear tube panel being directly connected to both said steam drum and said water drum, said main front tube panel and said main rear tube panel forming a main enclosure;

extension side tubes forming a lower extension roof as a continuation of said main roof, an extension front wall as a shortened continuation of said main front wall, and a lower extension floor located in a higher plane than said main floor, said extension side tubes being connected directly to both said steam drum and to said L-shaped lower side header;

forward burner-wall tubes forming an upper extension roof, a forward burner wall, an upper extension floor above said lower extension floor, and a lower forward burner-wall between said upper extension floor and said main floor, said forward burner-wall tubes being connected directly to both said steam drum and said lower burner-wall header;

rearward burner wall tubes forming with said forward burner-wall an extension end wall, said rearward burner wall tubes being connected directly to both said steam drum and said L-shaped lower side header;

rear extension tubes forming a rear extension panel, said rear extension tubes being connected directly to both said steam drum and said lower side header, said extension side tubes, said forward burner wall tubes, said rearward burner wall tubes, and said rear extension tubes, forming an extension enclosure extending from said main enclosure;

partition tubes within both said main enclosure and said extension enclosure, said partition tubes within said main enclosure being connected directly to said steam drum and said water drum and said partition tubes within said extension enclosure being connected to said steam drum and said lower side headers, and multiple tubes forming a main bank of tubes within said enclosure rearwardly of said partition tubes, said main bank of tubes being connected directly to both said steam drum and said water drum.

3. A steam generator comprising:

a major enclosure of steam generating tubes including a floor, a minor enclosure of steam generating tubes, said minor enclosure extending from said major enclosure and being in a higher plane than said floor of said major enclosure, a steam drum extending across the top of both said major enclosure and said minor enclosure, said steam generating tubes of both of said enclosures being directly connected to said steam drum, a water drum extending across the bottom of only said major enclosure, only said steam generating tubes of said major enclosure being directly connected to said water drum, a lower side header lying directly beneath said minor enclosure and in a plane above said water drum, the steam generating tubes of said minor enclosure being directly connected to said lower side header, a lower burner-wall header being directly connected to and extending horizontally and perpendicularly from said water drum, the remaining portion of the steam generating tubes of said minor enclosure being directly connected to said lower burner-wall header, means for connecting said lower side header to said lower burner-wall header, and, means for connecting said lower side header to said water drum.

4. A steam generator comprising:

a major enclosure of steam generating tubes including a floor, a minor enclosure of steam generating tubes, said minor enclosure extending from said major enclosure and being in a higher plane than said floor of said major enclosure, a steam drum extending across the top of both said major enclosure and said minor enclosure, said steam generating tubes of both of said enclosures being directly connected to said steam drum, a water drum extending across the bottom of only said major enclosure, only said steam generating tubes of said major enclosure being directly connected to said steam drum, a water drum extending across the bottom of only said major enclosure, only said steam generating tubes of said major enclosure being directly connected to said water drum, an L-shaped lower side header lying directly beneath said minor enclosure and in a plane above said water drum, a portion of the steam generating tubes of said minor enclosure being directly connected to said L-shaped lower side header, a lower burner-wall header being directly connected to and extending horizontally and perpendicularly from said water drum, the remaining portion of the steam generating tubes of said minor enclosure being directly connected to said lower burner-wall header, at least one conduit connecting said L-shaped lower side header to said lower burner-wall header, and a conduit for connecting said L-shaped lower side header to said water drum.

References Cited by the Examiner

UNITED STATES PATENTS

| | | | |
|---|---|---|---|
| 2,360,260 | 10/1944 | Nagel | 122—347 |
| 2,550,066 | 4/1961 | Hardgrove | 122—347 |
| 2,636,484 | 4/1953 | Bailey et al. | 122—328 |
| 3,022,774 | 2/1962 | Hamilton et al. | 122—478 |

FOREIGN PATENTS

| | | |
|---|---|---|
| 889,331 | 9/1943 | France. |

KENNETH W. SPRAGUE, *Primary Examiner.*

UNITED STATES PATENT OFFICE
CERTIFICATE OF CORRECTION

Patent No. 3,272,186

September 13, 1966

Robert A. Lorenzini

It is hereby certified that error appears in the above numbered patent requiring correction and that the said Letters Patent should read as corrected below.

Column 5, line 40, for "lightly" read -- slightly --; same column 5, line 71 and column 6, line 15, for "drum,", each occurrence, read -- drum; --; column 6, line 3, after "T-shaped" insert -- lower side --; line 27, after "header" insert a semicolon; line 30, for "lower burner wall" read -- T-shaped lower side --; same column 6, line 49, for "header," read -- header; --; column 7, line 45, for "headers," read -- header; --; column 8, line 15, after "and" strike out the comma.

Signed and sealed this 16th day of July 1968.

(SEAL)

Attest:

Edward M. Fletcher, Jr.

Attesting Officer

EDWARD J. BRENNER

Commissioner of Patents